United States Patent [19]

McWade

[11] Patent Number: 4,665,880
[45] Date of Patent: May 19, 1987

[54] AIR FLOW CONTROLLER AND PREHEATER FOR INTERNAL COMBUSTION ENGINES

[76] Inventor: Duncan R. McWade, 4 Kiandra Crescent, Yerrinbool, N.S.W. 2575, Australia

[21] Appl. No.: 836,663

[22] Filed: Mar. 5, 1986

[30] Foreign Application Priority Data

Mar. 6, 1985 [AU] Australia .............................. 39596/85

[51] Int. Cl.$^4$ .......................................... F02M 15/00
[52] U.S. Cl. ..................................... 123/556; 123/555
[58] Field of Search ......................... 123/556, 590, 592

[56] References Cited

U.S. PATENT DOCUMENTS

| | | | |
|---|---|---|---|
| 3,203,158 | 10/1965 | Zadra | 55/505 |
| 3,777,728 | 12/1973 | Reiche | 123/556 |
| 3,850,152 | 11/1974 | Hollins | 123/556 |
| 4,020,815 | 5/1977 | Hubert | 123/556 |
| 4,089,214 | 5/1978 | Egami et al. | 123/556 |
| 4,359,997 | 11/1982 | Lyssy | 123/592 |

FOREIGN PATENT DOCUMENTS

| | | | |
|---|---|---|---|
| 294115 | 10/1969 | Australia . | |
| 2017983 | 10/1971 | Fed. Rep. of Germany | 123/556 |
| 2705114 | 8/1977 | Fed. Rep. of Germany | 123/556 |
| 25562 | 2/1983 | Japan | 123/556 |

OTHER PUBLICATIONS

Article "Australian Devices Reduce Vehicle Exhaust Gases", 3/4/71, Commonwealth Scientific & Industrial Research Org.

Primary Examiner—E. Rollins Cross
Attorney, Agent, or Firm—Dowell & Dowell

[57] ABSTRACT

An air flow controller and heater for use in preheating intake air being introduced into the carburetor of an internal combustion engine wherein the intake air is directed by fixed vanes or air flow guides into a spiral and therefore elongated flow path about an electrical heating element which is oriented downstream of the vanes or guides and along the air intake nozzle of an air filter housing which is mounted over the carburetor inlet.

6 Claims, 3 Drawing Figures

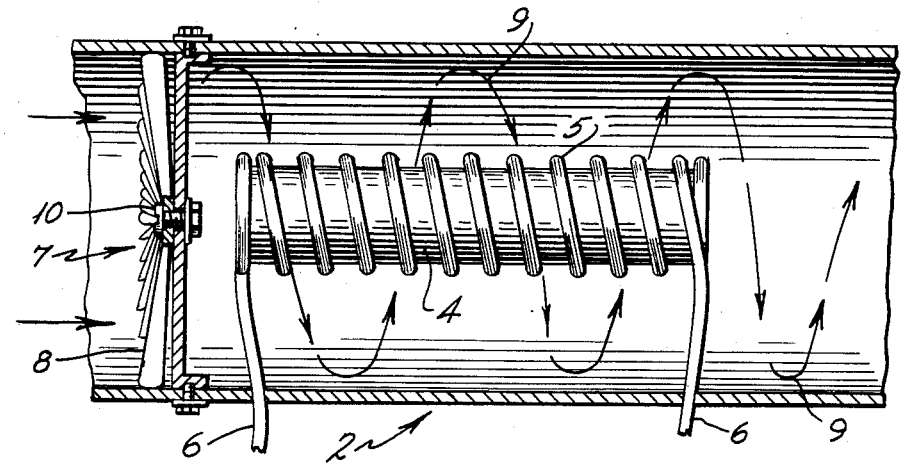
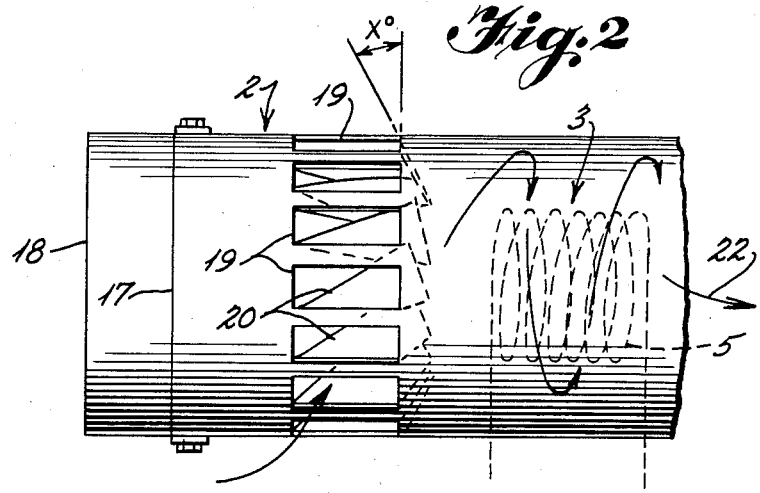
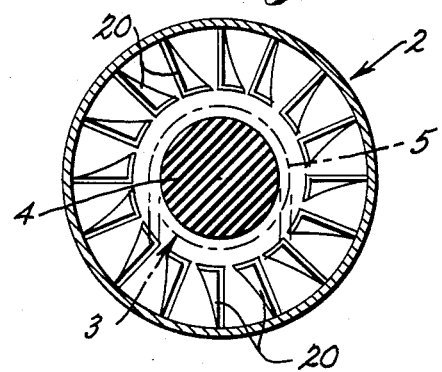

AIR FLOW CONTROLLER AND PREHEATER FOR INTERNAL COMBUSTION ENGINES

BACKGROUND OF THE INVENTION

1. Field of the Invention

This invention is generally related to devices for improving fuel consumption efficiency in internal combustion engines and particularly to an air flow controller and heater for preheating air being drawn into the carburetor of an internal combustion engine so as to improve the ignition characteristics of the air-fuel mixture.

2. History of the Prior Art

There have been many devices used to achieve the effect of improving fuel efficiency in internal combustion engines, but none have proved to be more than marginally effective. Among these devices are a group that are termed "Preheating Devices". These preheaters are normally placed into an engine's air intake system and are mounted so as not to restrict the air inlet flow to any great degree. Such preheaters are limited in the temperature improvement achieved due to the speed of air flow across the heating elements or units. Such preheating means can be electrically powered or be a heat exchanger which is connected to the engine's cooling system.

Some of these preheating devices have incorporated therewith a rotational fan blade to improve the turbulence of the engine's air intake. This method of preheating is not effective as it increases the speed of the air flow thus reducing the time for the preheating devices to effectively heat the entire volume of intake air, particularly at times when the engine is running at high speed and the air intake is at a much higher flow rate due to the induction of the engine.

It is an object of the present invention to provide a deflection means which substantially overcomes or ameliorates the above mentioned disadvantages.

SUMMARY OF THE INVENTION

According to one aspect of the present invention there is disclosed a deflection means for an internal combustion engine's air intake system. The deflection means includes at least one deflection unit to impart rotation to incoming air about an axis parallel to the desired longitudinal direction of air flow with the deflection means being located upstream of a heating means.

Preferably the deflection means is a series of stationary blades, placed ahead of a heater unit, however, the deflection means can also be a channel arrangement around the periphery of the air intake. Also, the deflection means should cover or extend across the cross-sectional area of the air intake passage.

Two embodiments of the present invention will now be described with reference to the accompanying drawings.

BRIEF DESCRIPTION OF THE DRAWINGS

FIG. 1 is a cross sectional view of the air intake nozzle to the carburetor of an internal combustion engine showing a side elevational view of the air flow controller and intake air preheater of the present invention.

FIG. 2 is a cross sectional view showing a side elevational view of a second embodiment of the air flow controller and intake air preheater of the present invention.

FIG. 3 is a front plan view of the embodiment of the invention shown in FIG. 2 and taken from the left side thereof.

DESCRIPTION OF THE PREFERRED EMBODIMENTS

Illustrated in FIG. 1 is a portion of an air intake system, however such a heating and deflection unit can be attached to other types of air intake ducting.

The arrangement in FIG. 1 comprises an air intake duct 2 which can be part of an existing system or bolted onto an existing system, and a heating element 3 which is located substantially along the central longitudinal axis of the duct 2.

The heating element includes a ceramic base 4 with an electrically powered, wire heating coil 5 located around the circumference thereof in a spiralling fashion. The ends 6 of the coil 5 are connected to positive and negative terminals to supply current to the coil 5.

The heating element 3 can be replaced by another heat source, such as a copper tube type heat exchanger which receives hot water from the engine cooling system.

Situated upstream of the heating element 3 is a deflector screen 7 which is bolted onto the duct 2 by means of fixing screws 10. The screen 7 includes a series of radial vanes 8 which extend from the center of the screen 7 or duct 2, to the outer circumference of the screen 7. This ensures that all the air passing throug the duct 2 will adopt the rotational flow as illustrated by arrows 9.

The vanes 8 can be either of a tapered shape, or if a maximum of rotational movement is to be transferred, then an arrangement of blades having substantially parallel sides could be used.

The screen 7 is made to conform with the shape and dimensions of the air intake duct 2 as some ducts can be square, rectangular or elliptical in cross-section. The deflection angle of the vanes 8 are set so as to optimise the amount of rotational movement imparted to the air flowing therethrough.

The heating element 3 and vanes 8 do not restrict the volume of air taken into the carburetor or engine, and by imparting rotation to the air flow, there is an increase in the time that the air flow is in contact with coil 5, thus allowing for more transfer of heat to the air.

In prior methods of increasing the amount of air taken in, such as turbo charging or to a lesser degree, the use of rotational fan blades, not only is the air-fuel ratio altered, but the thermal efficiency is also altered because, by the compression of air there is an energy release. Therefore, with greater compression ratios, there is a proportionately lower temperature of the compressed inlet-air. It is this reduction of the temperature of the intake air, that, when blended with the fuel in the carburetor mixing chamber reduces the temperature of the charge or air-fuel mixtures, thus making the mixture less volatile and reducing thermal efficiency.

Illustrated in FIGS. 2 and 3 is a second embodiment of the present invention. Like the screen 7 of FIG. 1, the deflection plate 17 can be bolted onto duct 2 or built integrally therewith. The deflection plate 17 closes off end 18 of the air inlet housing thereby forcing air to be taken in via the ports 19. The ports 19 each have an angled or partially circular shaped duct or guide member 20 attached thereto. The ducts 20 extend inwardly thereby directing air around the circumference of duct 2 (as illustrated in FIG. 3) as well as being directed in the direction of air flow (to the engine in direction of arrow 22) by virtue of the ducts 20 being deplaced x degrees from a direction perpendicular to the longitudinal axis of duct 2.

The cross-sectional areas of the ports 19 may be such that their total cross-sectional surface area is greater than that of the duct 2.

The deflection plate 17 allows air to be taken into the heating element through ports 19 with a swirling motion already imparted thereto.

The foregoing describes two embodiments of the present invention and modifications made by those skilled in the art can be made thereto without departing from the scope of the present invention. For example, a number of heating elements 3 can be located around the circumference or periphery of the duct 2.

The claims defining the invention are as follows:

1. An apparatus for controlling and preheating the air flow into the air intake duct of an internal combustion engine comprising air deflection means mounted to the air intake duct and being in fixed relationship thereto, a heater means mounted within the air intake duct and downstream of said air deflection means, said air deflection means including a plurality of shaped vane elements for directing substantially the entire flow of air in the intake duct in a spiral flow path around said heater means.

2. The apparatus of claim 1 in which said plurality of shaped vane elements are mounted across the air intake duct, each of said vane elements extending radially outwardly with respect to one another from adjacent the center of the air intake duct into proximate relationship to the outer periphery of the air intake duct, each of said vane elements being angled along their length so as to create a spiral flow of air passing from said deflection means and toward said heater means.

3. The apparatus of claim 2 in which said heater means includes an elongated core portion extending generally along the longitudinal axis of the air intake duct, and heating wire spirally wrapped about said core portion.

4. The apparatus of claim 1 in which said air deflection means includes a plurality of radially spaced ports disposed through the air intake duct upstream of said heater means, shaped guide members disposed within the air intake duct and extending inwardly from adjacent each of said ports, each of said guide members extending in a curved configuration inwardly toward said heater means so that air passing adjacent thereto will be guided in a spiral flow path around said heater means, the entire air flow into the air intake duct being through said radially spaced ports, whereby the air flow within the intake duct will be guided along said guide members and thereafter around said heater means in a spiral flow path.

5. The apparatus of claim 4 in which the total cross sectional area of said ports is at least as great as the cross sectional area of the air intake duct.

6. An apparatus for controlling and preheating the air flow into the air intake duct of an internal combustion engine comprising an air deflection means, means for mounting said air deflection means within the air intake duct so that all the air flow therethrough passes through said air deflection means, an elongated heater means mounted within the air intake duct and extending longitudinally with respect thereto, said heater means being mounted downstream of said air deflection means, said air deflection means including a plurality of shaped vane elements which are fixedly mounted within the air intake duct, each of said vane elements extending radially outwardly with respect to one another from adjacent the center of the air intake duct to the outer periphery thereof, each of said vane elements being angled along their length so as to create a spiral flow of air passing therebetween and toward said heater means.

* * * * *